United States Patent
Fukui et al.

(10) Patent No.: US 8,412,248 B2
(45) Date of Patent: *Apr. 2, 2013

(54) COMMUNICATION METHOD, WIRELESS COMMUNICATION SYSTEM, TRANSMITTER, AND RECEIVER

(75) Inventors: Noriyuki Fukui, Tokyo (JP); Shigenori Tani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/473,850

(22) Filed: May 17, 2012

(65) Prior Publication Data

US 2012/0230276 A1  Sep. 13, 2012

Related U.S. Application Data

(62) Division of application No. 12/663,421, filed as application No. PCT/JP2007/075181 on Dec. 27, 2007.

(30) Foreign Application Priority Data

Jun. 18, 2007 (JP) .................................. 2007-160698

(51) Int. Cl.
    *H04B 7/00* (2006.01)
(52) U.S. Cl. ........ 455/509; 455/431; 455/436; 455/524; 370/328; 370/329
(58) Field of Classification Search .................. 455/509, 455/431, 436, 524; 370/328, 329
    See application file for complete search history.

(56) References Cited

U.S. PATENT DOCUMENTS

| | | | |
|---|---|---|---|
| 5,818,841 A * | 10/1998 | Shen | 370/395.21 |
| 7,042,857 B2 * | 5/2006 | Krishnan et al. | 370/329 |
| 2007/0165568 A1 * | 7/2007 | Damnjanovic et al. | 370/329 |
| 2007/0242636 A1 * | 10/2007 | Kashima et al. | 370/329 |
| 2007/0274256 A1 * | 11/2007 | Murai et al. | 370/328 |

FOREIGN PATENT DOCUMENTS

| | | |
|---|---|---|
| JP | 2007-288754 | 11/2007 |
| WO | 2007-052766 | 5/2007 |
| WO | 2007-055292 | 5/2007 |

OTHER PUBLICATIONS

3GPP TSG RAN WG1 Meeting #49bis, R1-072917, "Resource Block Mapping for EUTRA Downlink Distributed Transmissions", Mitsubishi Electric, Philips, pp. 1-6 (Jun. 29, 2007).

(Continued)

*Primary Examiner* — Sanh Phu
(74) *Attorney, Agent, or Firm* — Oblon, Spivak, McClelland, Maier & Neustadt, L.L.P.

(57) ABSTRACT

A wireless system for allocating a predetermined number of subcarriers as a plurality of resource blocks to terminals includes a base station that communicates with the terminals, wherein the base station sets M resource blocks adjacent to one another in a frequency domain as a resource block group, M being a positive integer, and uses a first communication method and a second communication method, the first communication method repeatedly and sequentially classifying the resource block group into M kinds of subsets from a first subset to an M-th subset, and the second communication method allocating two resource blocks, which are separated by a predetermined distance in the frequency domain, to a same terminal, wherein the predetermined distance being an integer multiple of M times M.

2 Claims, 22 Drawing Sheets

OTHER PUBLICATIONS

Nagata, S. et al., Block-Wise Resourse Block-Level Distributed Transmission for Shared Data Channel in OFDMA-Based Evolved UTRA Downlink, The Institute of Electronics, Information and Communication Engineers, IEICE Technical Report, vol. 106, No. 168, pp. 251-256 (Jul. 12, 2006).

R1-072119 (RAN1 #49 Meeting) "DL Unicast Resource Allocation Signaling", NEC Group, pp. 1-6 (May 7-11, 2007).

R1-075067 (RAN1 #51 Meeting) "Outcome from Adhoc Session on RB Signaling", Ericsson, pp. 1 (Nov. 6, 2007).

3GPP TSG RAN1 #51, "A Simple Example of Dynamic DVRB Signaling", Motorola, pp. 1 (Nov. 5-9, 2007).

Japanese Office Action issued Jun. 26, 2012 in Patent Application No. 2010-147433 with Partial English Translation.

3GPP TSG RAN WG1 Meeting #51 R1-074552, "Further Study of Resource Allocation in Downlink", Mitsubishi Electric, Nov. 5-9, 2007.

3GPP TSG RAN WG1 Meeting #50bis R1-074079, "Comparasion of Downlink Resource Allocation Indication Schemes", Samsung, Oct. 8-12, 2008.

3GPP TSG RAN WG1 Meeting #51bis R1-080113, "Mapping Rule of Disributed Resource Allocation", Mitsubishi Electric, Jan. 14-18, 2008.

* cited by examiner

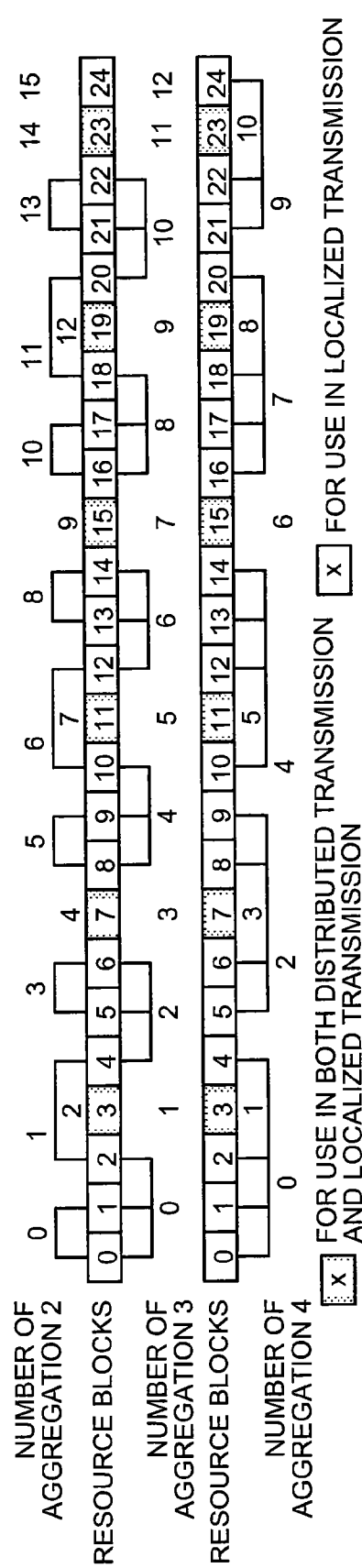

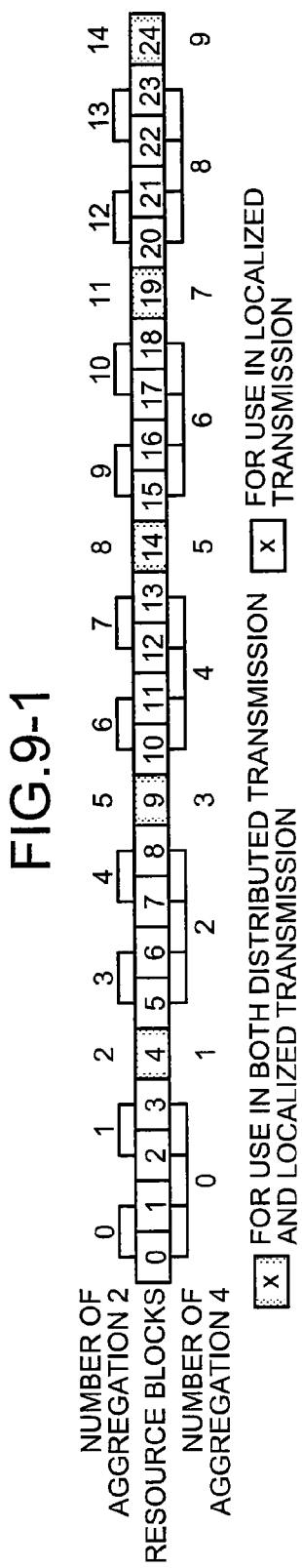

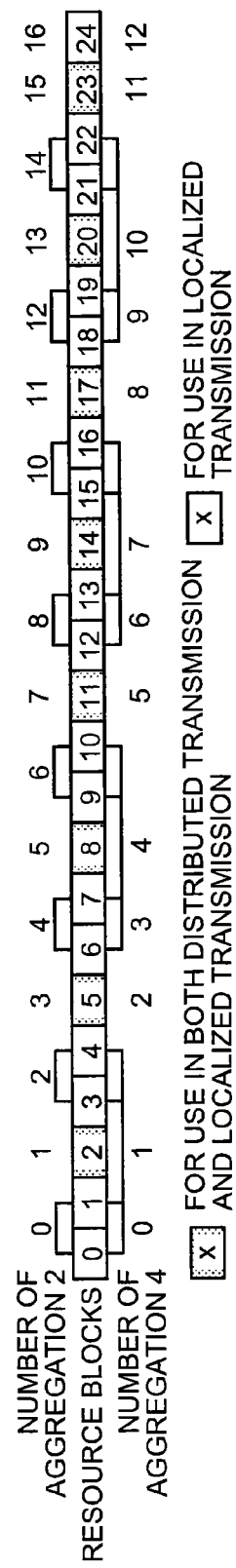

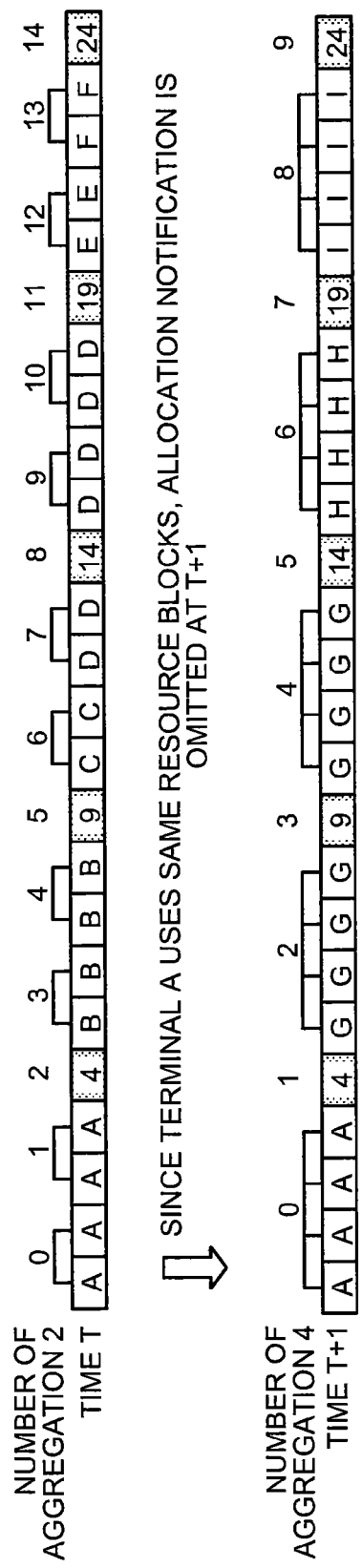

FIG.14

| RESOURCE BLOCK NUMBER | SCHEDULING RESOURCE NUMBER | | | |
|---|---|---|---|---|
| | 1 AGGREGATION | 2 AGGREGATION | 3 AGGREGATION | 4 AGGREGATION |
| 0 | 0 | 0 | 0 | 0 |
| 1 | 1 | 0 | 0 | 0 |
| 2 | 2 | 1 | 0 | 0 |
| 3 | 3 | 1 | 1 | 0 |
| 4 | 4 | 2 | 1 | 1 |
| 5 | 5 | 2 | 1 | 1 |
| 6 | 6 | 3 | 2 | 1 |
| 7 | 7 | 3 | 2 | 1 |
| 8 | 8 | 4 | 2 | 2 |
| 9 | 9 | 4 | 3 | 2 |
| 10 | 10 | 5 | 3 | 2 |
| 11 | 11 | 5 | 3 | 2 |
| 12 | 12 | 6 | 4 | 3 |
| 13 | 13 | 6 | 4 | 3 |
| 14 | 14 | 7 | 4 | 3 |
| 15 | 15 | 7 | 5 | 3 |
| 16 | 16 | 8 | 5 | 4 |
| 17 | 17 | 8 | 5 | 4 |
| 18 | 18 | 9 | 6 | 4 |
| 19 | 19 | 9 | 6 | 4 |
| 20 | 20 | 10 | 6 | 5 |
| 21 | 21 | 10 | 7 | 5 |
| 22 | 22 | 11 | 7 | 5 |
| 23 | 23 | 11 | 7 | 5 |
| 24 | 24 | 12 | 8 | 6 |

FIG.15-1

| HEADER BIT | TRANSMISSION TYPE | BIT MAP SIZE | RESOURCE BLOCK RANGE CORRESPONDING TO BIT MAP |
|---|---|---|---|
| 000 | Localized | 34bit | IN UNITS OF ONE RESOURCE BLOCK, RESOURCE BLOCKS OF 34 HIGH FREQUENCIES |
| 001 | Localized | 34bit | IN UNITS OF ONE RESOURCE BLOCK, RESOURCE BLOCKS OF 34 INTERMEDIATE FREQUENCIES |
| 010 | Localized | 34bit | IN UNITS OF ONE RESOURCE BLOCK, RESOURCE BLOCKS OF 34 LOW FREQUENCIES |
| 011 | Localized | 34bit | IN UNITS OF TWO RESOURCE BLOCKS, SCHEDULING RESOURCES OF 34 HIGH FREQUENCIES (=68 RESOURCE BLOCKS) |
| 100 | Localized | 34bit | IN UNIT OF TWO RESOURCE BLOCKS, SCHEDULING RESOURCES OF 34 LOW FREQUENCIES (=68 RESOURCE BLOCKS) |
| 101 | Localized | 34bit | IN UNITS OF THREE RESOURCE BLOCKS, 34 SCHEDULING RESOURCES (=100 RESOURCE BLOCKS) |
| 110 | Localized | 34bit | START POINT AND SUCCESSIVE NUMBERS BY SUCCESSIVE RESOURCE BLOCK ALLOCATION (POSSIBLE UP TO TWO GROUPS) |
| 111 | Distributed | 34bit | IN UNITS OF ONE RESOURCE BLOCK, START POINT AND RESOURCE BLOCK INTERVAL BY CONSTANT INTERVAL ALLOCATION, ALLOCATION IN RESOURCE BLOCK |

COMMUNICATION METHOD, WIRELESS COMMUNICATION SYSTEM, TRANSMITTER, AND RECEIVER

CROSS REFERENCE TO RELATED APPLICATION

The present application is a divisional of U.S. application Ser. No. 12/663,421, filed on Dec. 7, 2009, which was the National Stage of International Application No. PCT/JP2007/075181, filed on Dec. 27, 2007, which claimed priority to Japanese Application No. 2007-160698, filed on Jun. 18, 2007. Application Ser. No. 12/663,421 is hereby incorporated by reference in its entirety.

TECHNICAL FIELD

The present invention relates to a communication method, wireless communication system, and transmitter and receiver that configure the system when Localized transmission and Distributed transmission are mixed in the same sub-frame.

BACKGROUND ART

Currently in 3GPP, under the name of LTE (Long Term Evolution), a wireless system adopting a new wireless technique has been studied. In this wireless system, a plurality of data channel resources are defined on a frequency axis to measure the state of quality of each channel and, based on the measurement results, a data channel resource for use in communication is determined. And, a notification about the data channel resource determined therein is made as allocation information by using a control channel to each terminal configuring the system mentioned above.

Also, in a downstream (base station→terminal) frame studied as LTE, a control channel and a data channel are disposed in one sub-frame, and resource allocation is performed in units of this sub-frame. Further, in a system frequency band, 100 channels are present according to current studies. And, each of these channels is called a resource block, and is configured of, for example, twelve sub-carriers. Still further, to each terminal configuring the system mentioned above, one or a plurality of resource blocks can be allocated.

Still further, in LTE, a terminal regularly measures channel quality in units of one resource block or several resource blocks, and reports the measurement result to a base station in which a scheduler is present. Then, based on the report, the scheduler allocates a resource block of good quality to a terminal that performs channel allocation. In this manner, in LTE, a technique of data transmission with resource-block allocation based on the channel quality is referred to as "Localized transmission". In this Localized transmission, in notifying a terminal of allocation information, a bit map is used, for example. When a bit map is used, N resource blocks present in a system frequency band are associated with N bits, and a bit corresponding to a resource block to which a terminal is allocated is set at "1". For example, when eight resource blocks are assumed, with a terminal A having allocated thereto resource blocks #0, #1, #6, and #7, a terminal B having allocated thereto resource blocks #2 and #3, and a terminal C having allocated thereto resource blocks #4 and #5, allocation information for notification by using control channels are "11000011", "00110000", and "00001100".

However, as explained above, since 100 resource blocks are present at maximum in LTE, notification to each terminal by using a bit map of 100 bits leads to a shortage of control channels. To avoid this shortage, in 3GPP, a method of regarding two resource blocks as one scheduling unit (hereinafter referred to as aggregation) has also been studied. For example, when the number of aggregation is assumed to be 2 and the allocation information mentioned above is represented with a bit map, pieces of the allocation information for notification to the terminal A, B, and C are "1001", "0100", and "0010", respectively. Note that while this method is in a studying stage in 3GPP, aggregation of three or four resource blocks has also been studied as a technique of reducing the control channels.

On the other hand, although the Localized transmission mentioned above is an effective technique when the traveling speed of the terminal is slow, it cannot be much an effective technique when the traveling speed is fast. For example, since reporting the channel quality and scheduling require a certain processing time, when the traveling speed is fast, changes of the channel quality in a direction of time is quickened, and therefore the contents of the report of the channel quality may possibly be obsolete at the time of actual data transmission. In such circumstances, since the possibility of allocating a resource block with deteriorated quality and the possibility of applying an unsuitable modulation technique or the like are increased, it is not preferable to select a resource block based on the channel quality of individual resource blocks and further adaptively change a modulation technique and an error correction coding rate. Therefore, to a terminal with a fast traveling speed, a technique is taken in which data to be transmitted by that terminal is distributed into a plurality of resource blocks with a small correlation each other as to the channel state on a frequency axis. That is, a technique is adopted such that an average value of the channel quality of the allocated resource blocks is stabilized (frequency diversity). And, when this technique is adopted, the modulation technique and the error correcting coding rate are determined not based on the channel quality of individual resource blocks but based on the average channel quality of the entire system frequency. In this manner, a technique of data transmission by allocating resource blocks distributed on the frequency axis to the same terminal is referred to as "Distributed transmission".

While general outlines of Localized transmission and Distributed transmission have been explained above, a specific method of making a notification about the resource blocks allocated by the respective techniques is explained next. In a first non-patent document mentioned below, a method of making a notification about allocated resource blocks regarding the respective techniques is disclosed. FIG. 15-1 is a diagram depicting allocation information in this notifying method. In this example, by using a header bit, a notification is made about a distinction between Localized/Distributed transmissions (transmission type), a bit map size, and a resource block range corresponding to the bit map. And, FIG. 15-2 is a diagram for explaining how 34 bits at the time of Distributed transmission make a notification about resource in the method depicted in FIG. 15-1. For example, first thirteen bits indicate a start point: (0) for the allocated resource blocks and a resource block interval: (3), and next twelve bits indicate allocation in the resource block (x-th stage of a 12-way-split fragmented resource) as a bit map of the fragmented resource. Note herein that the remaining bits are assumed to be dummy bits for coordinating with the bit number at the time of Localized transmission.

Also, in a second non-patent document, "Sub-sampling transmission" is disclosed as a modification of the Localized transmission explained above. This Sub-sampling transmission is a method defined for allocating the remaining resources in units of one resource block after allocation of resource blocks with Localized transmission. Note that while the Localized transmission mentioned above and Sub-sampling transmission are both classified as Localized transmission and distinguished therein as approach 1 and approach 3, respectively, in 3GPP, they are distinguished hereinafter also as Localized transmission and Sub-sampling transmission for convenience.

FIG. 17 is a diagram for explaining Sub-sampling transmission. As depicted in FIG. 17, in Sub-sampling transmission, a concept of subsets is introduced, and their breaks are synchronized with the number of aggregation in Localized transmission. Specifically, when the number of aggregation in Localized transmission is M, the number of subsets is also M, and resource blocks configuring one subset are those obtained by periodically collecting certain M resource blocks aggregated in Localized transmission. And, the period is defined as [M resource blocks×M subsets]. In FIG. 17, an example of M=4 is depicted and, in this case, the period mentioned above is 4×4=16. Also, in this Sub-sampling transmission, resource blocks to be allocated to one terminal have to be selected from the same subset, and allocating resource blocks from different subsets to one terminal is not allowed.
First non-patent document: R1-072119 (May 7-11, 2007, RANI #49 Meeting, NEC)
Second non-patent document: R1-075067 (Nov. 5-9, 2007, RANI #51 Meeting, Ericsson)

DISCLOSURE OF INVENTION

Problem to be Solved by the Invention

In the studies in LTE of 3GPP explained above, Localized transmission and Distributed transmission are mixed in the same sub-frame. Also, the number of resource blocks for use in Distributed transmission is changed for each sub-frame or for every several sub-frames. In such circumstances, when the notifying method explained above is applied, problems as explained below will occur.

FIGS. 16-1 and 16-2 are diagrams each depicting a state in which Localized transmission and Distributed transmission are mixed. FIG. 16-1 depicts a case where the number of aggregation is 2 in Localized transmission and the interval of resource blocks for use in Distributed transmission is 3. And, FIG. 16-2 depicts a case where the number of aggregation is 2 in Localized transmission and the interval of resource blocks for use in Distributed transmission is 5. Note herein that the interval mentioned above is replaced by a variable of N_DPRB, which is the number of resource blocks for Distributed transmission that are present on the system. That is, when the system bandwidth is determined, N_DPRB is uniquely determined from the interval mentioned above. Therefore, N_DPRB=4 in FIG. 16-1, whilst N_DPRB=3 in FIG. 16-2.

Also, in FIG. 16-1 and FIG. 16-2, Ln (n=0, 1, 2 . . . ) represents a scheduling resource number allocated for Localized transmission, whilst Dn (n=0, 1, 2 . . . ) represents a scheduling resource number allocated for Distributed transmission.

When FIG. 16-1 and FIG. 16-2 are compared with each other, for example, resource blocks configuring a scheduling resource number L0 for use in Localized transmission are the same (1, 2) therebetween, but resource blocks configuring a scheduling resource number L1 are not the same therebetween ((4, 5) in FIGS. 16-1 and (3, 4) in FIG. 16-2). With this, even when a notification is made about a scheduling resource number with a bit map, a terminal cannot specify a resource block to be received. That is, to specify a resource block to be received by a terminal to which Localized transmission is applied, a notification about N_DPRB is further required. Also, even when a notification about N_DPRB is made, the terminal to which Localized transmission is applied has to specify, from the value of the notified N_DPRB, the position of a resource block being used for Distributed transmission and, in consideration of that position, determine a resource block corresponding to the bit map. With these, in a system where Localized transmission and Distributed transmission are mixed in the same sub-frame, there are problems of making a receiving process complex, increasing the circuit size, and further causing a process delay.

Furthermore, in LTE of 3GPP explained above, there is no statement at all about definitions regarding to which resource block each bit of the bit map corresponds when Localized transmission and Distributed transmission are mixed in the same sub-frame.

When Sub-sampling transmission is mixed in the same sub-frame in addition to Localized transmission and Distributed transmission, a problem as depicted in FIG. 18 arises. FIG. 18 depicts the state of the remaining resource blocks after resource block allocation with Localized transmission and Distributed transmission, wherein non-hatched resource blocks, that is, portions denoted as Part A and Part B, are the remaining resource blocks. Here, since Part A and Part B belong to different subsets, when resource blocks are allocated with Sum-sampling transmission, due to the prohibitions in Sub-sampling transmission mentioned above, both resource block groups cannot be allocated to the same terminal, and therefore there is disadvantageously no flexibility in allocating resources.

The present invention has been devised in view of the above, and an object thereof is to obtain a communication method capable of avoiding complexity of a receiving process when Localized transmission and Distributed transmission are mixed in the same sub-frame.

The present invention has been devised in view of the above. An object thereof is to obtain a communication method that enhances flexibility in allocating resources for Sub-sampling transmission when Localized transmission, Distributed transmission, and Sub-sampling transmission are mixed in the same sub-frame.

To solve the abovementioned problem, and to achieve the above object, a wireless system for allocating a predetermined number of subcarriers as a plurality of resource blocks to terminals includes a base station that communicates with the terminals, wherein the base station sets M resource blocks adjacent to one another in a frequency domain as a resource block group, M being a positive integer, and uses a first communication method and a second communication method, the first communication method repeatedly and sequentially classifying the resource block group into M kinds of subsets from a first subset to an M-th subset, and the second communication method allocating two resource blocks, which are separated by a predetermined distance in the frequency domain, to a same terminal, wherein the predetermined distance being an integer multiple of M times M.

Means of Solving the Problem

To solve the above mentioned problem, and to achieve the above object, in a wireless communication system where data transmission is performed between a base station and terminals by using a system frequency band configured of a plurality of resource blocks, a communication method according to one aspect of the present invention when two transmission types, Localized transmission and Distributed transmission, are mixed in a same sub-frame, includes, as a process to be performed by the base station, a transmission-type selecting step of selecting a transmission type to be applied to each terminal, based on traveling speed information obtained from each of the terminals configuring the wireless communication system; a number-of-aggregation determining step of determining the number of aggregation based on the number of terminals to which Localized transmission is applied; a bit-map generating step of individually generating, for each terminal, a bit map indicative of scheduling resource numbers to be allocated to the terminals to which Localized transmission is applied, based on a resource-number mapping rule defined by individually providing resource block numbers to all of the resource blocks, taking resource block numbers of resource blocks for Distributed transmission as fixed values, and individually providing scheduling resource numbers to remaining resource blocks for Localized transmission except the resource blocks for Distributed transmission for each of scheduling resources corresponding to the number of aggregation; and an allocation-information generating and transmitting step of generating and transmitting, for each terminal, resource allocation information including the transmission types and the bit maps.

Furthermore, in a wireless communication system where data transmission is performed between a base station and terminals by using a system frequency band configured of a plurality of resource blocks, a communication method according to another aspect of the present invention when three transmission types, Localized transmission, Distributed transmission, and Sub-sampling transmission, are mixed in a same sub-frame, includes, as a process to be performed by the base station, a transmission-type selecting step of selecting a transmission type to be applied to each terminal, based on traveling speed information obtained from each of the terminals configuring the wireless communication system; a number-of-aggregation determining step of determining the number of aggregation based on the number of terminals to which Localized transmission is applied; a resource-block-for-Sub-sampling-transmission selecting step of selecting, as resource blocks to be allocated for Distributed transmission, based on the determined number of aggregation, resource blocks belonging to a specific single subset among a plurality of subsets for use in Sub-sampling transmission; a resource-block allocating step of allocating resource blocks to each terminal based on the determined number of aggregation and the selection result at the resource-block-for-Sub-sampling-transmission selecting step; and an allocation-information generating and transmitting step of individually generating and transmitting, for each terminal, resource allocation information including the transmission types and the allocation result at the resource-block allocating step.

Effects of the Invention

According to the present invention, an effect can be achieved such that, even in a system where Localized transmission and Distributed transmission are mixed in the same sub-frame, the receiving process by the terminal can be simplified, compared with the conventional technology, and an increase in circuit size and process delay can be avoided.

According to the present invention, an effect can be achieved such that, even in a system where Localized transmission, Distributed transmission, and Sub-sampling transmission are mixed in the same sub-frame, flexibility in allocating resource blocks for Sub-sampling transmission can be enhanced, compared with the conventional technology.

BRIEF DESCRIPTION OF DRAWINGS

FIG. 1-2 is a diagram depicting an example of structure of a terminal for achieving the communication method according to the present invention.

FIG. 2 is a diagram depicting an example of structure of a downstream frame which has been studied as LTE.

FIG. 8 is a diagram depicting an example of providing scheduling resource numbers when a resource block allocated for Distributed transmission is used for Localized transmission.

FIG. 9-1 is a diagram depicting one example of assigning a scheduling resource number in a second embodiment.

FIG. 9-2 is a diagram depicting one example of assigning a scheduling resource number in the second embodiment.

FIG. 9-3 is a diagram depicting one example of a scheduler algorithm in the second embodiment.

FIG. 10-1 is a diagram depicting one example of assigning scheduling resource numbers in the second embodiment.

FIG. 10-2 is a diagram depicting one example of assigning scheduling resource numbers in the second embodiment.

FIG. 14 is a diagram depicting one example of providing scheduling resource numbers in the third embodiment.

FIG. 15-1 is a diagram depicting one example of conventional allocation information.

FIG. 15-2 is a diagram for explaining how 34 bits at the time of Distributed transmission make a notification about resource blocks.

FIG. 16-1 is a diagram depicting a state in which Localized transmission and Distributed transmission are mixed.

FIG. 16-2 is a diagram depicting a state in which Localized transmission and Distributed transmission are mixed.

Figure 1:
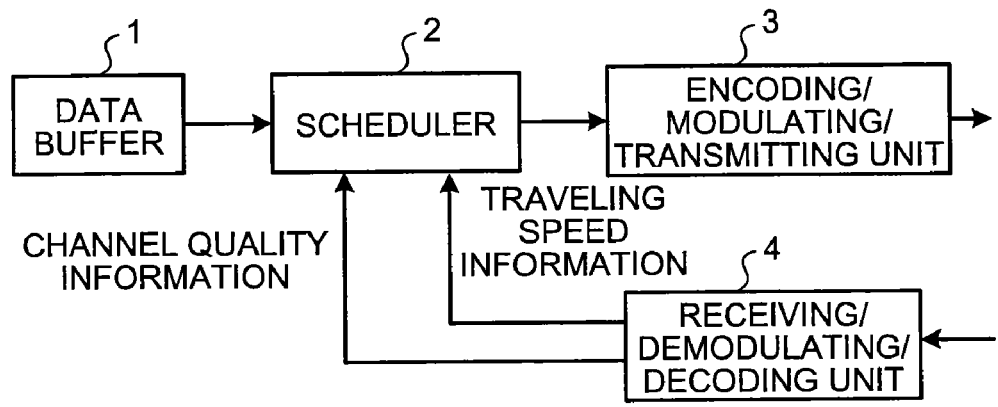
FIG. 1-1 is a diagram depicting an example of structure of a base station for achieving a communication method according to the present invention.

DESCRIPTION OF REFERENCE NUMERALS 1 data buffer
2 scheduler
3 encoding/modulating/transmitting unit
4 receiving/demodulating/decoding unit
11 receiving unit
12 receiving buffer
13 control-information analyzing unit
14 data demodulating/decoding unit
15 channel-quality-information generating unit
16 encoding/modulating/transmitting unit

BEST MODES FOR CARRYING OUT THE INVENTION

In the following, embodiments of the communication method, wireless communication system, and transmitter and receiver that configure the system according to the present invention are explained in detail based on the drawings. Note that the present invention is not meant to be restricted by these embodiments.

First Embodiment

Figures 1, 2:
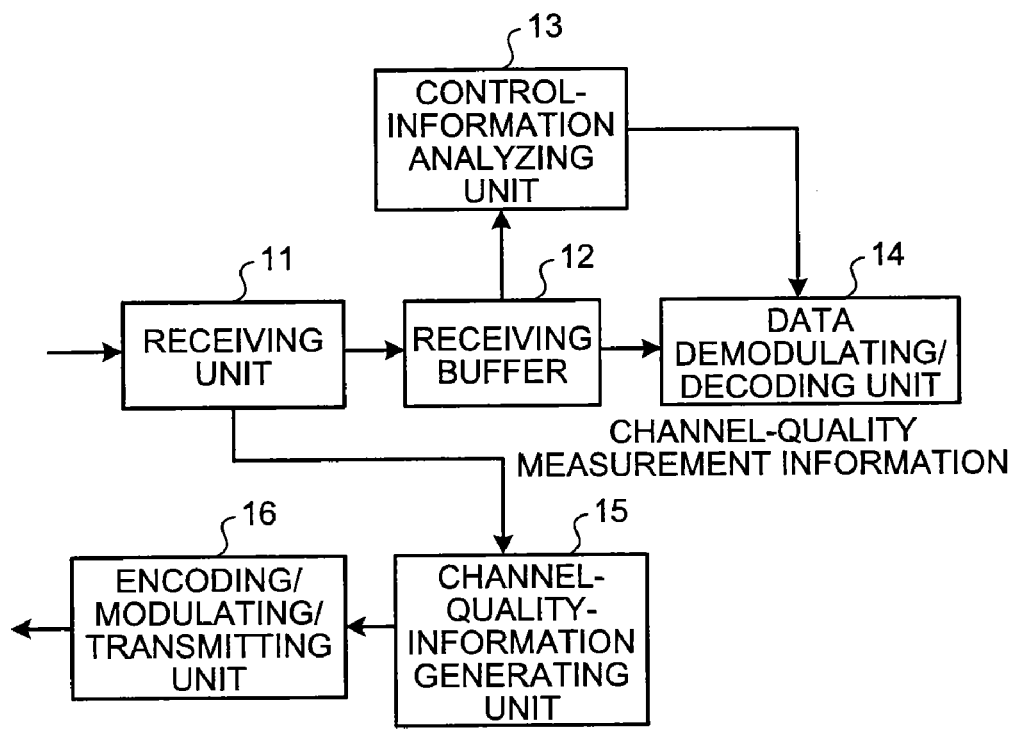
Figure 2:
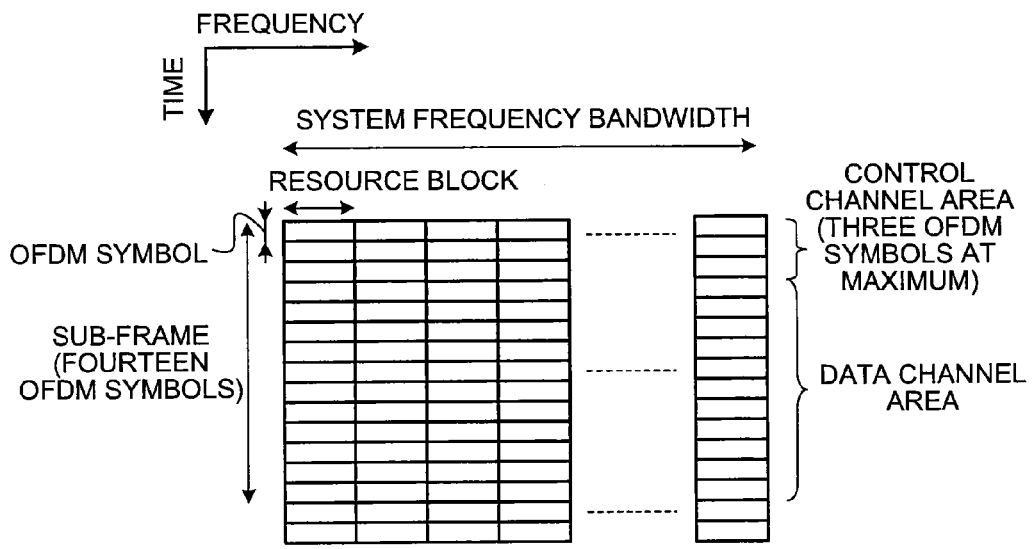

FIG. 1-1 is a diagram depicting an example of structure of a base station operating as a transmitter for achieving the communication method according to the present invention. This base station is assumed to be configured to include a data buffer 1, a scheduler 2, a coding/modulating/transmitting unit 3, and a receiving/demodulating/decoding unit 4. Also, FIG. 1-2 is a diagram depicting an example of structure of a terminal operating as a receiver for achieving the communication method according to the present invention. This terminal is assumed to be configured to include a receiving unit 11, a receiving buffer 12, a control-information analyzing unit 13, a data demodulating/decoding unit 14, a channel-quality-information generating unit 15, and an encoding/modulating/ transmitting unit 16. Furthermore, in the present embodiment, by way of example, it is assumed that the base station depicted in FIG. 1-1 above and a plurality of terminals depicted in FIG. 1-2 configure a wireless communication system.

In the base station depicted in FIG. 1-1, data to each terminal received via an external network is temporarily stored in the data buffer 1. The scheduler 2 monitors the data reception state, reads from the data buffer 1 data to be sent to a terminal selected through scheduling, and sends it to the encoding/modulating/transmitting unit 3. Also, in scheduling, the scheduler 2 obtains from the receiving/demodulating/ decoding unit 4 channel quality information and traveling speed information received from each terminal. Then, based on the traveling speed information, information about the transmission type to be included in resource allocation information of which each terminal is notified, that is, whether Localized transmission is applied or Distributed transmission is applied, is selected. Also, based on the channel quality information, a terminal to perform data transmission is selected, and a modulating technique and others are selected. Furthermore, based on the number of terminals for scheduling and others, the number of aggregation at the time of Localized transmission is determined, thereby generating a bit map for notification about resource allocation. Thereafter, the encoding/modulating/transmitting unit 3 transmits to each terminal resource allocation information (information including the transmission type and bit map explained above, and others) generated by the scheduler 2. Note herein that while the traveling speed information is obtained from the receiving/demodulating/decoding unit 4, this is not meant to be restrictive, and the traveling speed may be estimated by the scheduler itself based on the speed of change of channel quality.

On the other hand, in the terminal depicted in FIG. 1-2, signals received via the receiving unit 11 are temporarily accumulated in the receiving buffer 12. The control-information analyzing unit 13 extracts resource allocation information from signals accumulated in the receiving buffer 12, and analyzes that information. That is, it is determined whether a control channel for its own terminal is present and, when it is determined that a control channel for its own channel is present, it is determined whether Localized transmission is applied or Distributed transmission is applied as a transmission type included in the resource allocation information to be sent to its own terminal. At the same time, a process of determining the number of aggregation and a process of specifying a resource block allocated to its own station based on the bit map are performed. Then, the data demodulating/ decoding unit 14 is notified of these analysis results. The data demodulating/decoding unit 14 performs a demodulating process and a decoding process on the specified resource block. Also, the receiving unit 11 measures the channel quality from the received signal and, thereafter, the channel-quality-information generating unit 15 converts the measurement result to a predetermined reporting format. The encoding/ modulating/transmitting unit 16 then replies to the base station with channel quality information after format conversion.

Here, prior to explanation of features of the present invention, the technology on which the present invention is predicated is explained. FIG. 2 is a diagram of the structure of a downstream (base station→terminal) frame studied as LTE and the positions of control channels and data channels disposed in that frame. One sub-frame is configured of fourteen OFDM symbols, and resource allocation (scheduling) is performed in units of these sub-frames. The system frequency band is 20 megahertz at maximum, and 100 channels are present according to the current studies. These channels are referred to as resource blocks, each being configured of twelve sub-carriers (one sub-carrier=15 kilohertz). Then, to one terminal, one or a plurality of resource blocks can be allocated. Also, a control channel on which resource allocation information is carried is disposed in an area up to first three OFDM symbols at maximum among the fourteen OFDM symbols mentioned above. In this control channel area, a plurality of control channels are present for a plurality of terminals. Also, at the rear of this control channel area, a data channel area is disposed from the next OFDM symbol.

Figure 3:
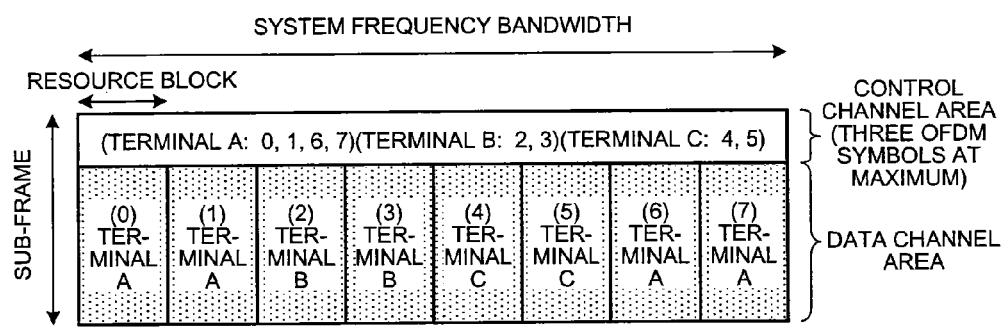
FIG. 3 is a diagram depicting one example when resource blocks are allocated to terminals A, B, and C.

And, FIG. 3 is a diagram depicting one example when resource blocks are allocated to terminals A, B, and C. In this diagram, resource blocks (0, 1, 6, 7), (2, 3), and (4, 5) are allocated to the terminals, respectively, and they are each notified of resource allocation information with the control channels. This is the case where data transmission is performed with the Localized transmission explained above. By using the bit map similarly explained above, a notification about resource allocation information is made. In the example of FIG. 3, the terminals A, B, and C are notified of "11000011", "00110000", and "00001100", respectively.

Figure 4:
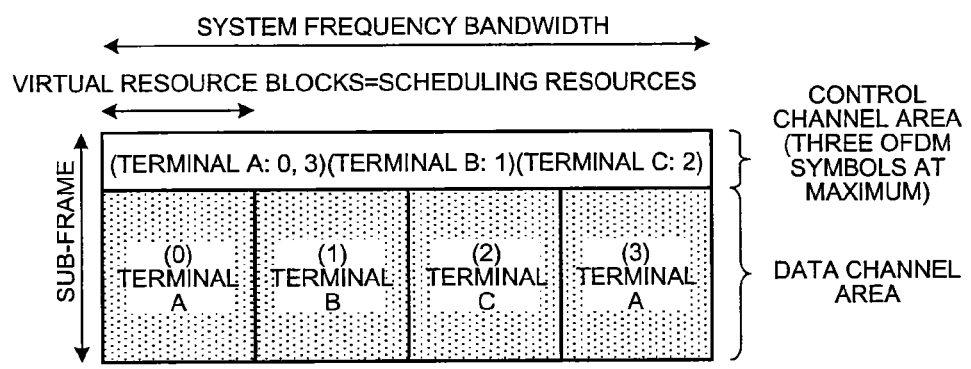
FIG. 4 is a diagram depicting a state of virtual resource block allocation when aggregation is used.

However, as explained above, since 100 resource blocks are present at maximum in LTE, notification to each terminal by using a bit map of 100 bits leads to a shortage of control channels. To avoid this shortage, in 3GPP, aggregation has also been studied. When aggregation is performed to represent the allocation depicted in the example of FIG. 3 with a bit map, the base station notifies the terminals A, B, and C of "1001", "0100", and "0010", respectively. The state of virtual resource-block allocation when aggregation is performed is depicted in FIG. 4. Here, the depicted virtual resource blocks when aggregation is performed are referred to as scheduling resources.

Figure 5:
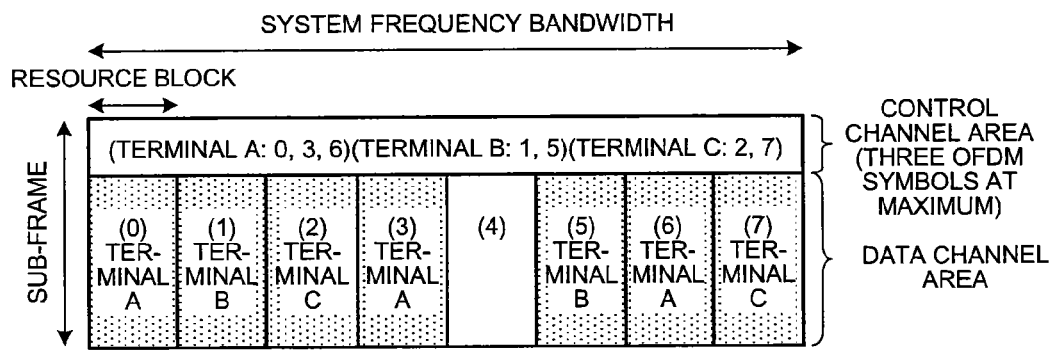
FIG. 5 is a diagram depicting one example of Distributed transmission.

On the other hand, it has already been explained that, although the Localized transmission mentioned above is an effective technique when the traveling speed of the terminal is slow, it cannot be much an effective technique when the traveling speed is fast. FIG. 5 is a diagram depicting one example of Distributed transmission. Here, the interval of the resources to be allocated to the terminals A, B, and C are separated from each other as much as possible, thereby preventing a correlation as to the channel state among the resource blocks allocated to the same terminal.

Figure 6:
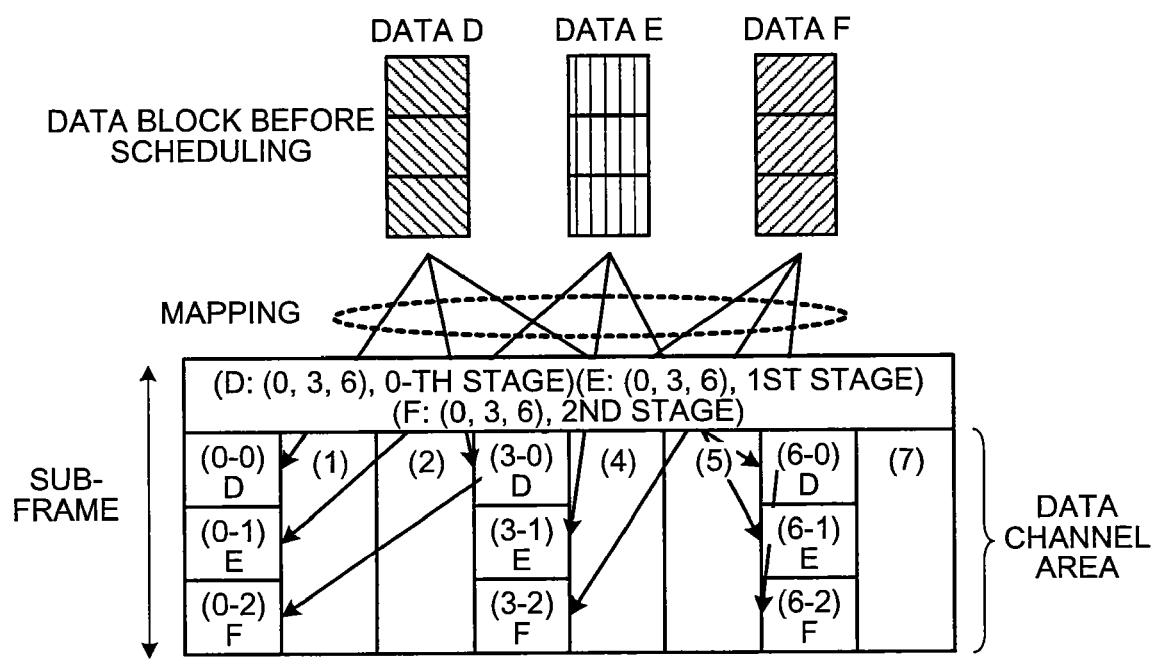
FIG. 6 is a diagram depicting one example of a scheme of mapping, to resource block, data blocks before scheduling, which has been studied in 3GPP.

And, FIG. 6 is a diagram depicting one example of a scheme of mapping, to resource blocks, data blocks before scheduling, which has been studied in 3GPP. When data D, E, and F in the drawing are data to the same terminal, this is the same case as that of resource block allocation to the terminal A in FIG. 5. That is, one terminal occupies resource blocks (0, 3, 6). On the other hand, when the data D, E, and F are data to different terminals, as depicted in FIG. 6, three resource blocks are shared among three terminals. Besides, when data D and E are data to a terminal G and the data F is data to a terminal H, for example, three resources can be shared between two terminals.

Next, in consideration of the technology explained above on which the present invention is predicated, a resource-allocation notifying method of the present embodiment is explained.

Figure 7:
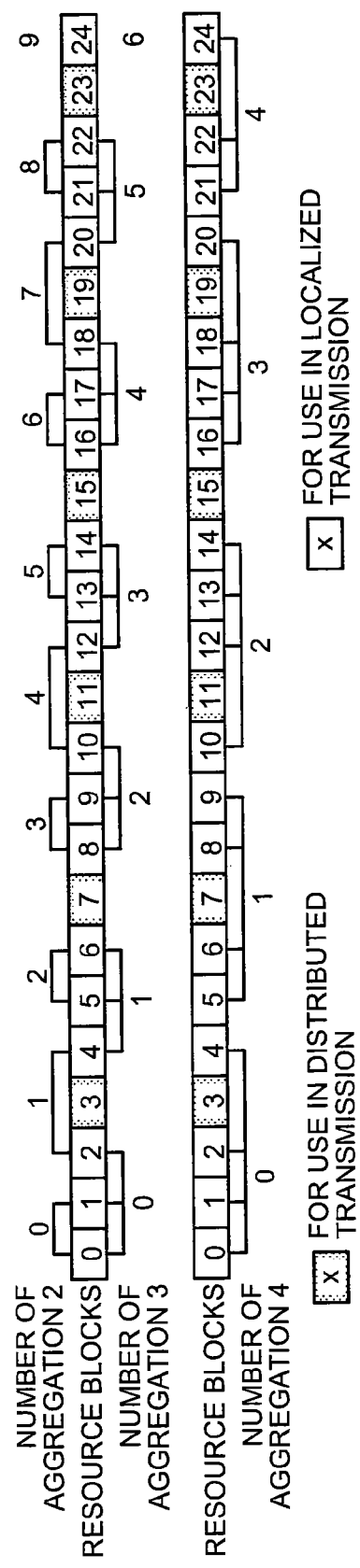
FIG. 7 is a diagram depicting one example of a resource-allocation notifying process in a first embodiment.

FIG. 7 is a diagram depicting one example of a resource-allocation notifying process of the present embodiment and, in detail, a mapping rule for resource block numbers and scheduling resource numbers for Localized transmission. The depicted resource block numbers are serial numbers that are individual for the respective resource blocks, and the scheduling resource numbers are serial numbers that are individual for the respective scheduling units (scheduling resources) corresponding to the number of aggregation. In the present embodiment, the case in which the number of resource blocks is 25 is taken as an example.

First, in the present embodiment, the scheduler 2 determines in advance a maximum value of the number of resource blocks for use in Distributed transmission and its position, and these pieces of information are shared between the base station and the terminals. Then, with that position being excluded, the scheduler 2 defines a method of providing a unique scheduling resource number for each number of aggregation. Specifically, in FIG. 7, resource block numbers (3, 7, 11, 15, 19, 23) are defined for Distributed transmission. The maximum number of resource blocks for Distributed transmission is 6. Also, in FIG. 7, scheduling resource numbers for Localized transmission are defined in advance for each number of aggregation, except the resource blocks for Distributed transmission explained above. The base station and the terminals share the resource block numbers for Localized transmission and a mapping rule for scheduling resource numbers. Note in the present embodiment that while the mapping rule mentioned above is defined by the scheduler 2, it does not necessarily have to be defined by the scheduler 2 as long as it can be shared between the base station and the terminals. Also, a mapping rule defined outside may be provided to the base station and the terminals.

With the mapping rule mentioned above being shared, based on the traveling speed information obtained from each terminal, the scheduler 2 of the base station generates information regarding the transmission type to be included in resource allocation information of which each terminal is notified. That is, whether Localized transmission is applied or Distributed transmission is applied is selected. Also, based on the channel quality information obtained from each terminal, a terminal to perform data transmission is selected, and a modulating technique and others are selected. Furthermore, based on the number of terminals for scheduling (terminals to which Localized transmission is applied) and others, the number of aggregation at the time of Localized transmission is determined. Based on this number of aggregation, a bit map for making a notification about a scheduling resource number indicative of a resource block to be allocated to the terminal to which Localized transmission is applied is generated individually for each terminal. Then, resource allocation information including these pieces of information is generated for each terminal, and each terminal is notified of this information.

In this manner, in the present embodiment, the positions of the resource blocks for Distributed transmission are defined in advance and, with these being excluded, scheduling resource numbers for Localized transmission are defined. With this, in the terminal to which Localized transmission is applied, based on the mapping rule explained above, a correspondence between the resource block numbers for Localized transmission and the scheduling resource numbers can be uniquely recognized for each number of aggregation. Therefore, irrespectively of the number of resource blocks for use in Distributed transmission, resource blocks allocated to its own station can be specified only with a resource allocation notification with a bit map. That is, the scheduler of the base station is not required to notify the terminal to which Localized transmission is applied of N_DPRB. Therefore, according to the present embodiment, even in a system where Localized transmission and Distributed transmission are mixed in the same sub-frame, a receiving process by the terminal can be simplified, compared with the conventional technology, and an increase in circuit size and process delay can be avoided.

Note in the above that, for the purpose of simplifying explanation, explanation has been made based on the premises that resource blocks allocated for Distributed transmission are not used as for Localized transmission (refer to FIG. 7). However, the present invention does not necessarily have to take this condition as a premise. For example, among resource blocks allocated for Distributed transmission, when a resource block not being actually used for Distributed transmission is present, that may be used for Localized transmission. In this manner, an example of providing scheduling resource numbers when a resource block allocated for Distributed transmission is used for Localized transmission is depicted in FIG. 8. In this case, to a resource block allocated for Distributed transmission, a scheduling resource number is singly provided. For example, to a resource block (15), "9" is assigned when the number of aggregation is 2, and "7" and "6" are assigned when the number of aggregation is 3 and 4, respectively. In this manner, for each number of aggregation, if a scheduling resource number is provided separately from that for Localized transmission, the corresponding resource block can be used flexibly for both Distributed transmission and Localized transmission. Also, when a resource block allocated for Distributed transmission is used for Localized transmission, a notification about a scheduling resource number corresponding to its resource block can be easily made with a bit map to the terminal. Note that the way of assigning a schedule resource number is depicted in FIG. 8 by way of example, and another method can be taken for provision. For example, for resource blocks dedicated to Localized transmission, provision may be made with the same method as that of FIG. 7, and the following number may be provided as a scheduling resource number to a resource block for Distributed transmission.

Second Embodiment

Subsequently, a communication method different from that in the first embodiment explained above is explained. Note that the structures of the base station and the terminals are similar to those in the first embodiment explained above. Here, processes different from those in the first embodiment are explained.

FIGS. 9-1 and 9-2 are diagrams each depicting one example of assigning a scheduling resource number in the second embodiment. In the present embodiment, scheduling resource numbers are provided so that a combination pattern of scheduling resources when aggregation in Localized transmission is performed and resource blocks for Distributed transmission is repeated with a specific periodicity in a frequency direction. For example, in FIG. 9-1, the combination pattern mentioned above corresponding to resource blocks (0)-(4) is repeated for resource blocks (5)-(9), resource blocks (10)-(14), . . . , thereby providing a scheduling resource number for each scheduling resource. Also, in FIG. 9-2, the combination pattern mentioned above corresponding to resource blocks (0)-(5) is repeated for resource blocks (6)-(11), resource blocks (12)-(17), . . . , thereby providing a scheduling resource number for each scheduling resource.

Note in the above that while the resource blocks for Distributed transmission can be used also for Localized transmission, this is not meant to be restrictive and, for example, as depicted in FIG. 7, they can be used as being dedicated to Distributed transmission.

In this manner, in the present embodiment, scheduling resource numbers are provided as depicted in FIGS. 9-1 and 9-2 explained above. Therefore, to a terminal to which resource blocks are once allocated by applying Localized transmission, another resource block can be easily allocated. That is, switching resource blocks becomes easy.

This is very effective in view of retransmission of transmitting data with the same data size as that of initial transmission, when flexibility occurs in the scheduler and the channel quality state is changed at an initial transmission timing and a retransmission timing.

Also, in FIGS. 9-1 and 9-2, the numbers of aggregation are 2 and 4, and the resource blocks for Distributed transmission are the same. This arrangement is possible by repeating a pattern of disposing resource blocks as many as an integral multiple of a lowest common multiple between 2 and 4 for Localized and then allocating the resource blocks for Distributed. This arrangement is an array on a frequency axis that can be applied even to a system in which the number of aggregation is dynamically changed between 2 and 4 with time. According to this array, even when the number of aggregation is changed, the same resource blocks are always allocated for Distributed transmission. Therefore, the number of resource blocks allocated for Localized transmission and that for Distributed transmission are constant, and the same resource blocks are ensured also for Localized transmission. With the constant number of resource blocks for Localized transmission and Distributed transmission, a simple scheduler algorithm can be expected. Also, with the same resource blocks ensured for Localized transmission and Distributed transmission, a scheduler algorithm is possible such that a notification about allocation information is once made to a terminal and resource blocks allocated based on that information continues in the same terminal thereafter (the terminal A in FIG. 9-3), thereby allowing reduction in control information. This is possible even when the numbers of aggregation are 2 and 3, by using an integral multiple of the least common multiple therebetween.

Figures 1, 10:
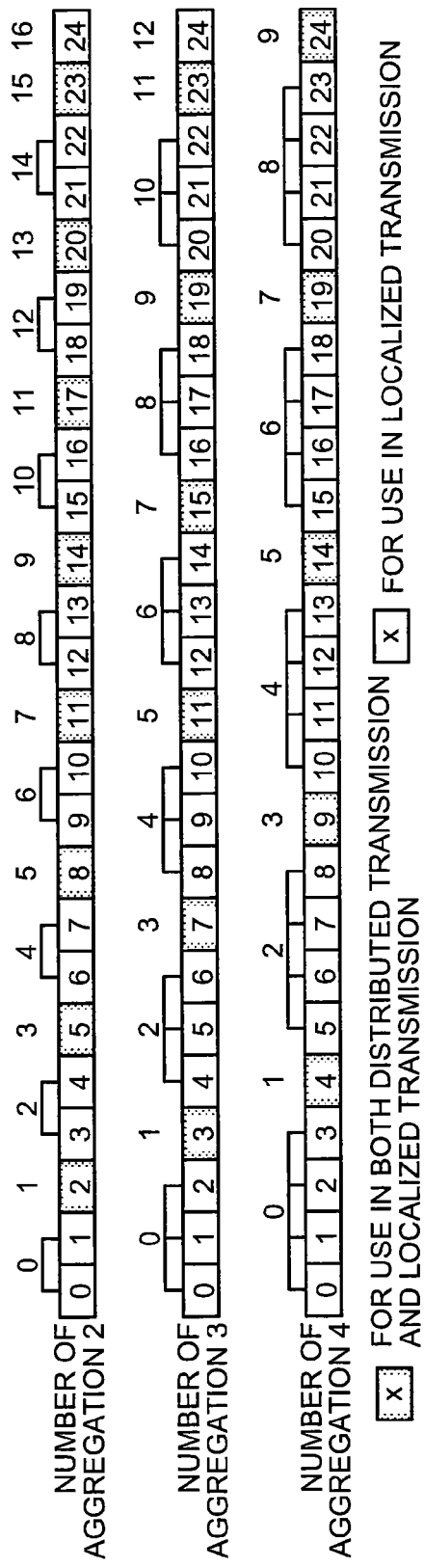
Figures 2, 10:
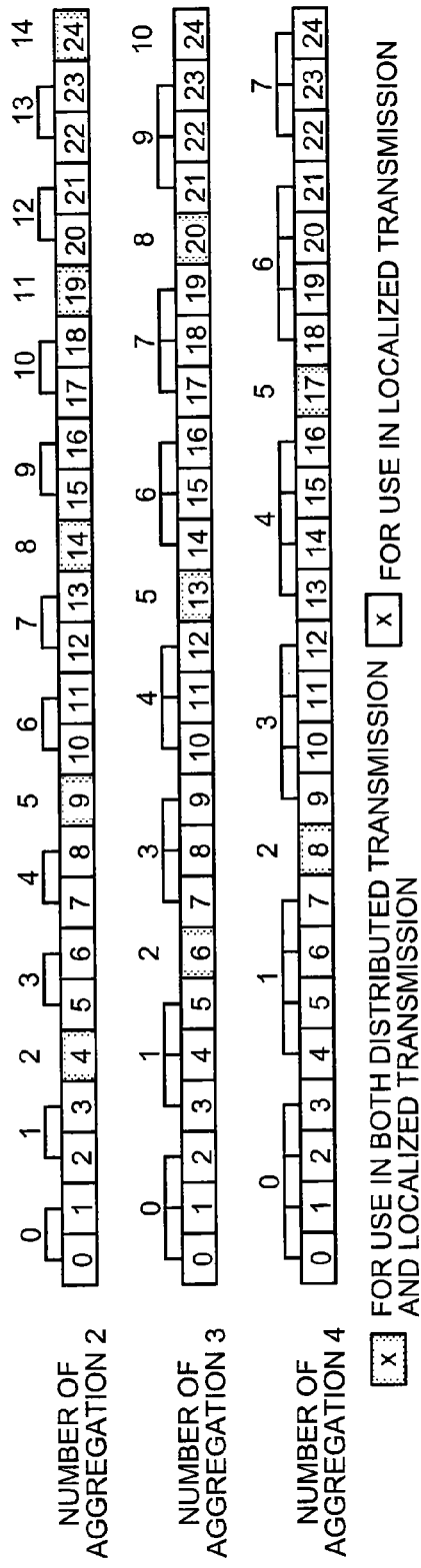

Note that FIGS. 10-1 and 10-2 are diagrams each depicting one example of assigning scheduling resource numbers in the second embodiment when the positions of the resource blocks for Distributed transmission are allowed to be different for each number of aggregation while the combination pattern explained above is repeated in a frequency direction. Also in this case, since a combination pattern of scheduling resources when aggregation in Localized transmission is performed and resource blocks for Distributed transmission is repeated in the frequency direction, effects similar to those in FIGS. 9-1 and 9-2 explained above can be obtained.

Also, in the present embodiment, as depicted in FIGS. 9-1, 9-2, 10-1, and 10-2, since the resource blocks for Distributed transmission can be used at the time of Localized transmission, scheduling resource numbers for Localized transmission are provided to individual resource blocks for Distributed transmission. However, scheduling resource numbers do not necessarily have to be provided to individual resource blocks for Distributed transmission.

Figure 11:
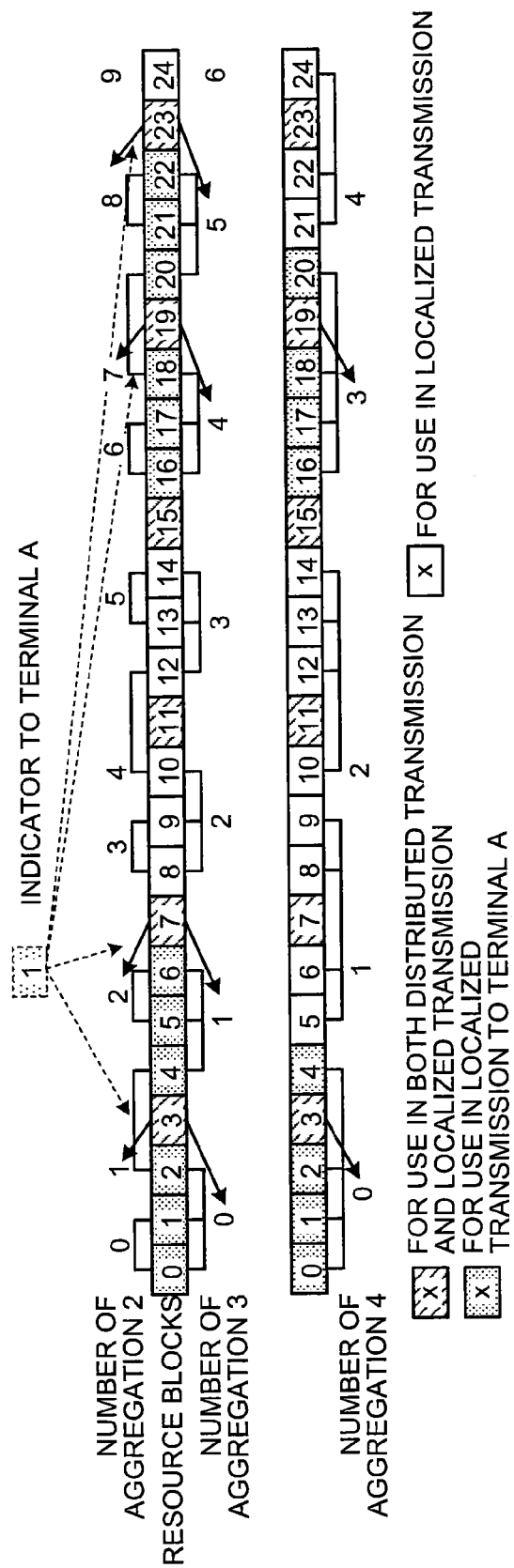
FIG. 11 is a diagram depicting one example when an indicator of one bit is set for each terminal without providing a scheduling resource number to each individual resource block for Distributed transmission.

For example, without providing scheduling resource numbers to individual resource blocks for Distributed transmission, an indicator of one bit can be set to the bit map for each terminal. When this indicator indicates "1", each terminal recognizes such that, for example, resource blocks for Distributed transmission that are present at the right of the resource blocks allocated to itself in Localized transmission and resource blocks for Distributed transmission interposed between resource blocks allocated to itself in Localized transmission are all allocated to itself. FIG. 11 is a diagram depicting one example when an indicator of one bit is set for each terminal without assigning a scheduling resource number to each individual resource block for Distributed transmission. It is assumed herein that, in an example in which the number of aggregation is 2 or 3, (0, 1, 2, 4, 5, 6, 16, 17, 18, 20, 21, 22) are allocated to a terminal A as resource blocks for Localized transmission. In FIG. 11, since the indicator to the terminal A indicates "1", the terminal A recognized such that resource blocks for Distributed transmission (3, 7, 19, 23) adjacent to the resource blocks for Localized transmission mentioned above are allocated also to itself. Similarly, in an example in which the number of aggregation is 4, (0, 1, 2, 4, 16, 17, 18, 20) are allocated to the terminal A as resource blocks for Localized transmission and, with the indicator indicating "1", it is recognized that resource blocks for Distributed transmission (3, 19) interposed therebetween are allocated also to itself. By using such a rule, it is not required to provide scheduling resource numbers for Localized transmission to individual resource blocks for Distributed transmission, thereby decreasing the bit map size for resource allocation notification and reducing a required capacity of control channels.

Third Embodiment

Subsequently, a communication method different from those in the first embodiment and the second embodiment explained above is explained. Note that the structures of the base station and the terminals are similar to those in the first embodiment explained above. Here, processes different from those in the first and second embodiments are explained.

Figure 12:
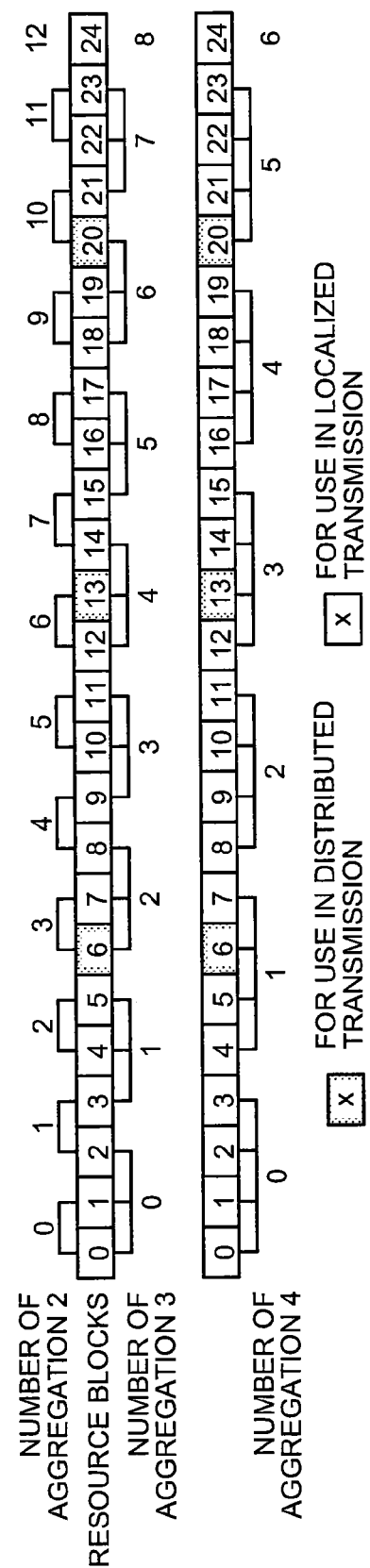
FIG. 12 is a diagram depicting one example of assigning scheduling resource numbers in a third embodiment.
Figure 13:
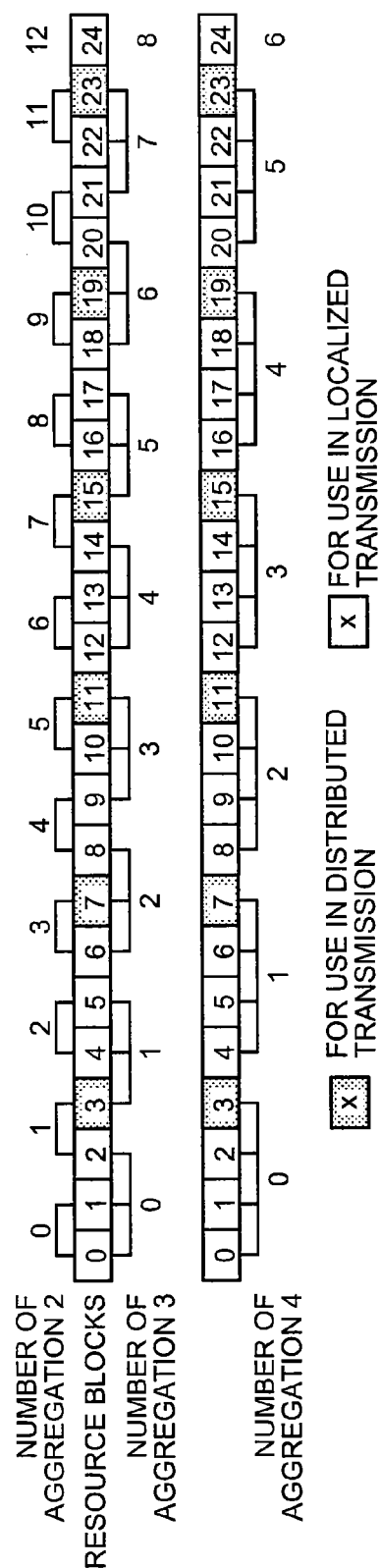
FIG. 13 is a diagram depicting one example of assigning scheduling resource numbers in the third embodiment.
Figures 2, 15:
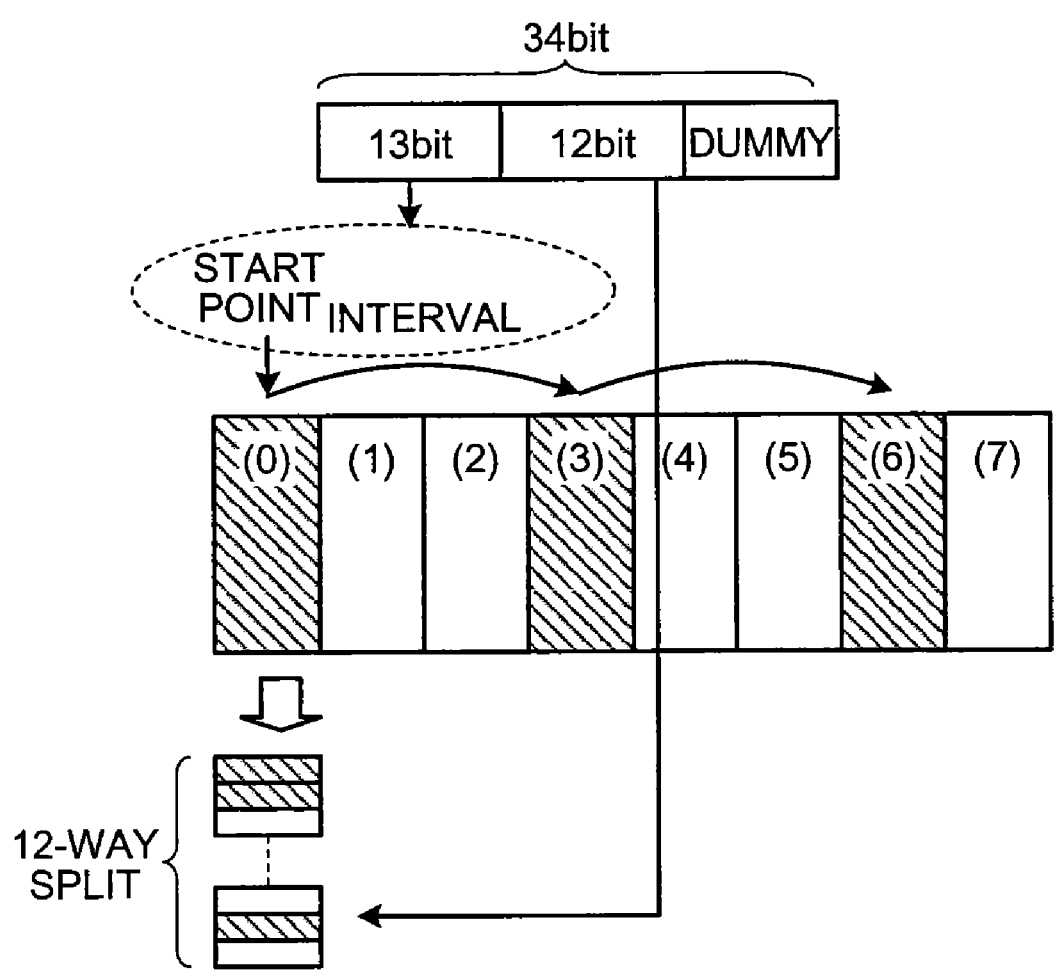
Figures 1, 16:
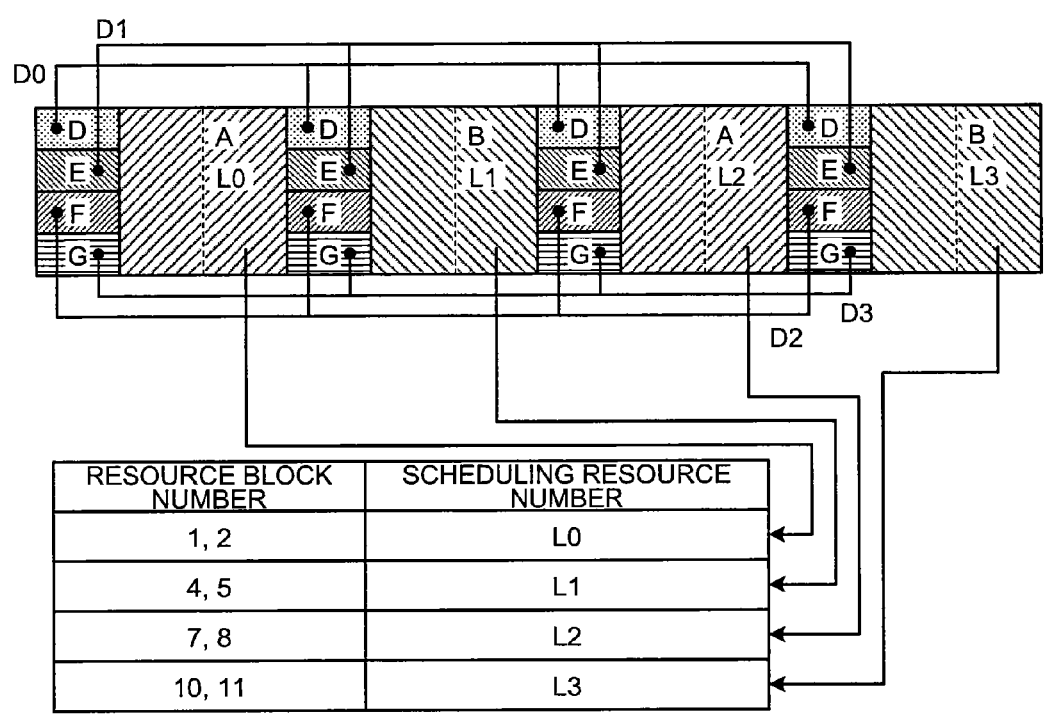
Figures 2, 16:
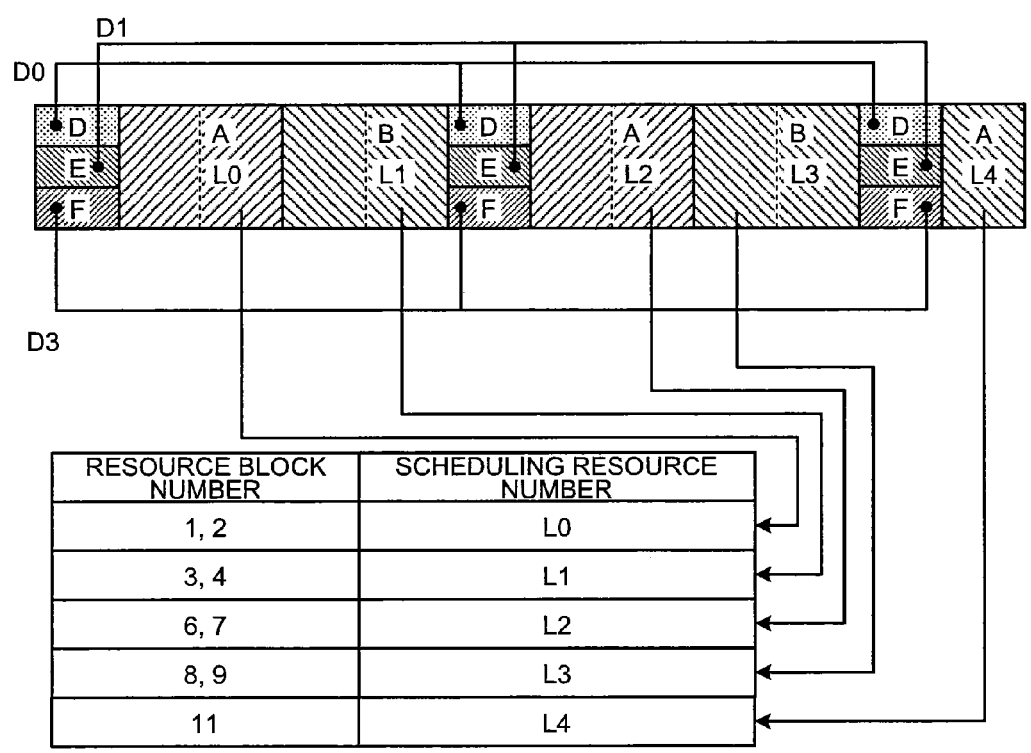
Figure 17:
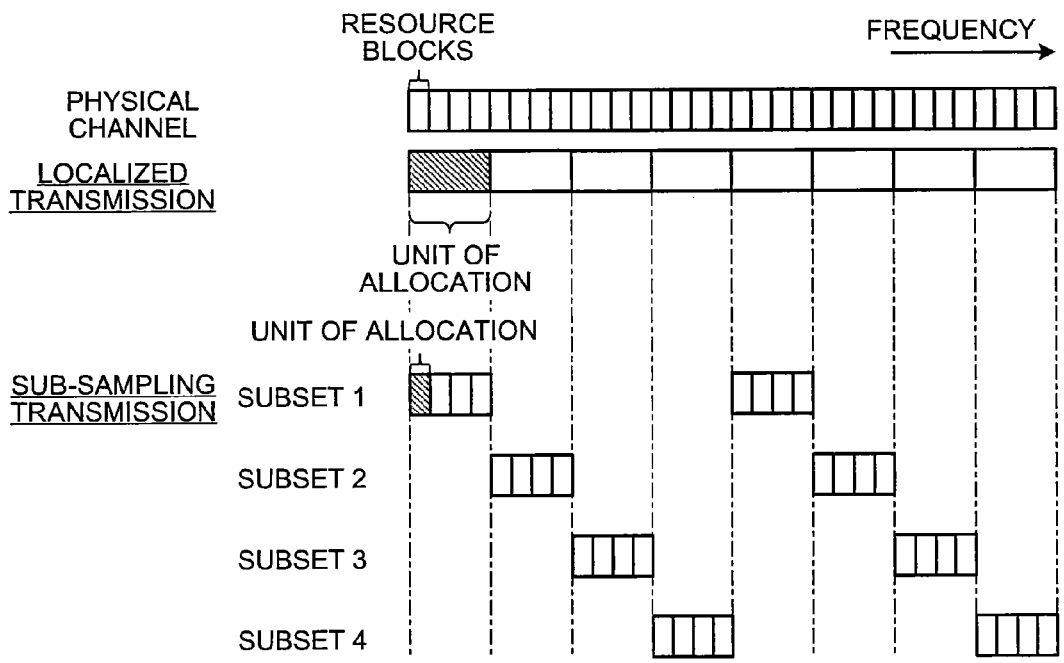
FIG. 17 is a diagram explaining Sub-sampling transmission.
Figure 18:
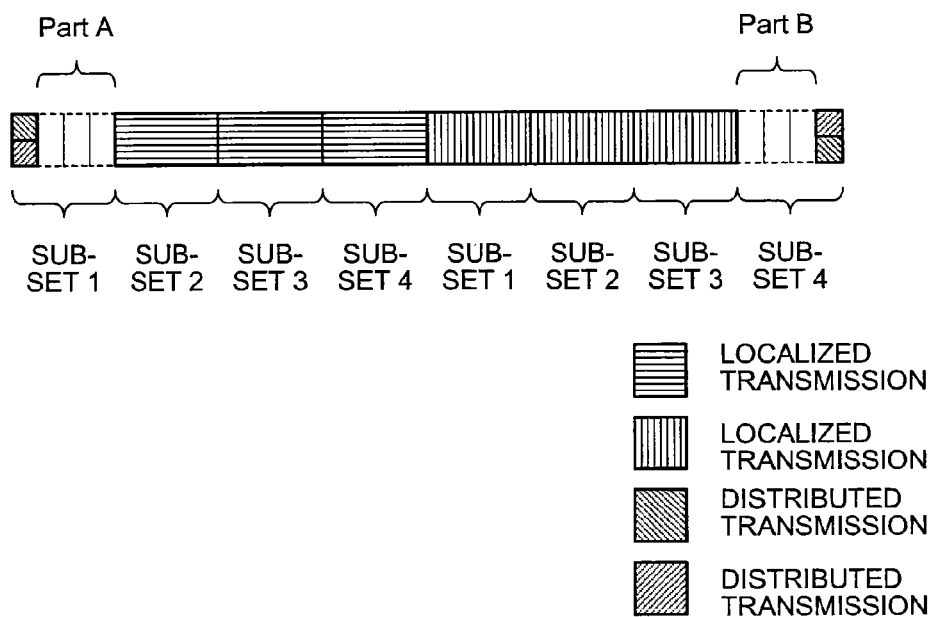
FIG. 18 is a diagram explaining a problem in conventional Distributed transmission.

FIGS. 12 and 13 are diagrams each depicting one example of assigning scheduling resource numbers in the third embodiment. In the present embodiment, provision of scheduling resource numbers when aggregation is performed is performed on all resource blocks. Also, the process of providing scheduling resource numbers in the present embodiment does not depend on the number of resource blocks for Distributed transmission: N_DPRB. It is predicated herein that notification about N_DPRB is allowed as control information overhead. It is also predicated that resource blocks as many as the number of N_DPRB are not used in Localized transmission.

As can be seen in comparison with FIGS. 12 and 13, in the third embodiment, irrespectively of N_DPRB, a correspondence between scheduling resource numbers and resource block numbers continues for each number of aggregation. As scheduling resource numbers, numbers obtained by incrementing in units of the number of aggregation are provided sequentially from a resource block (0). That is, sequentially from the head scheduling resource, scheduling resource numbers obtained by incrementing in units of scheduling resources are provided. FIG. 14 is a diagram depicting one example of providing scheduling resource numbers in the third embodiment. Here, upon receiving a resource allocation notification with a bit map, a terminal to which Localized transmission is applied performs the following process on the resource blocks corresponding to the scheduling resource numbers including resource blocks for Distributed transmission specified by N_DPRB. For example, from among the resource blocks corresponding to the scheduling resource numbers including the resource blocks for Distributed transmission, a demodulating and decoding process is performed on resource blocks except the resource blocks for Distributed transmission.

When a process of providing scheduling resource numbers depicted in FIGS. 12 and 13 is performed, the terminal can easily specify resource blocks allocated to itself. Specifically, first by expanding the bit map with the number of aggregation (when the number of aggregation is 2, "010" is expanded to "001100"), all resource blocks allocated for Localized transmission are determined. Then, among resource blocks corresponding to bits where "1" is set, bits corresponding to resource blocks overlapping resource blocks for Distributed transmission recognizable from N_DPRB are set at "0". With this, each terminal can specify all resource blocks for Localized transmission allocated to itself except the resource blocks for Distributed transmission. Therefore, in the present embodiment, even in a system where Localized transmission and Distributed transmission are mixed in the same subframe, a receiving process by the terminal can be simplified with this series of processes.

Note in the present embodiment that explanation has been made based on the premise that resource blocks allocated for Distributed transmission are definitely used as those for Distributed transmission. However, for example, by using the concept of an indicator explained above, resource blocks allocated for Distributed transmission can be used as those for Localized transmission. For example, when the indicator indicates "0", the terminal specifies, through the process explained above, all resource blocks for Localized transmission allocated to itself other than the resource blocks for Distributed transmission. On the other hand, when the indicator indicates "1", even when a resource block allocated to itself with a bit map and a resource block allocated for Distributed transmission overlap each other, the terminal determines that these resource blocks are allocated to itself for Localized transmission, and performs a demodulating and decoding process on all resource blocks allocated to itself with the bit map. By performing this process, the resource blocks allocated for Distributed transmission can be used for Localized transmission, thereby providing flexibility to the scheduler.

Fourth Embodiment

In the first to third embodiments explained above, the communication method when two transmission types, Localized transmission and Distributed transmission, are mixed has been explained. Next, a communication method when Sub-sampling transmission is further mixed in addition to these Localized transmission and Distributed transmission is explained. Note that the structures of the base station and the terminals are similar to those in the first embodiment explained above. In the present embodiment, processes different from those in the first to third embodiments are explained.

Figure 19:
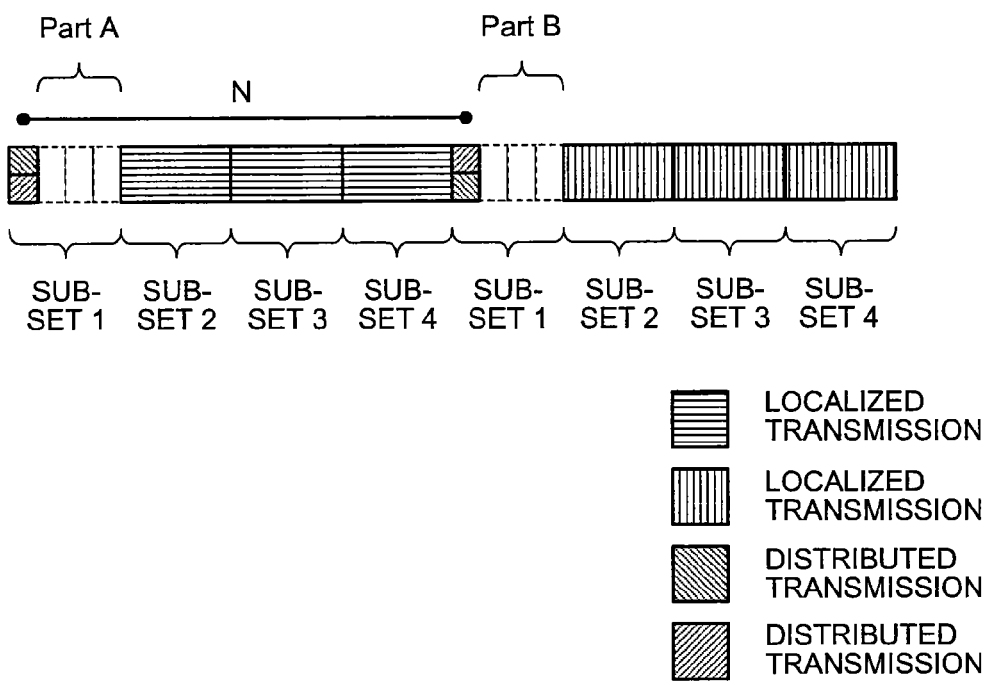
FIG. 19 is a diagram depicting a state of resource selection by Distributed transmission of a fourth embodiment.

FIG. 19 is a diagram depicting one example of a resource-allocation operation in the communication method of a fourth embodiment. As depicted in FIG. 19, in the communication method of the present embodiment, resource blocks belonging to the same subset are used when Distributed transmission is performed. To achieve this, in the base station of the present embodiment, as with the case of the first embodiment, the scheduler 2 performs a process of generating information about the transmission type based on the traveling speed information, a process of selecting a terminal to perform data transmission, a modulating technique, and others based on the channel quality information, and a process of determining the number of aggregation at the time of Localized transmission based on the number of terminals for scheduling. Then, as explained above, since the determination of the number of aggregation determines the structure of subsets, resource blocks (subsets) allocated for Distributed transmission are determined based on the determined number of aggregation. Thereafter, when resources are actually allocated to each terminal, resource blocks belonging to the same subset are allocated to a terminal that performs Distributed transmission.

Note that, as long as the condition "resource blocks for Distributed transmission belong to the same subset" is satisfied, resources may be allocated first to whichever terminal in the scheduling (resource allocation), either of a terminal to perform Distributed transmission and a terminal to perform Localized transmission. That is, it does not matter which scheduling is to be performed first, scheduling for a terminal to which Distributed transmission is applied or scheduling for a terminal to which Localized transmission is applied.

With this, when allocation is performed later in Sub-sampling transmission, since Part A and Part B of the remaining resource blocks belong to the same subset, these can be allocated to the same terminal. Also, as with the conventional technique, the possibility of allocating these to different terminals is still kept. That is, flexibility when resources for Sub-sampling transmission are allocated can be increased. Meanwhile, although a plurality of values that satisfy the condition mentioned above are present as a distance N of the resource blocks on the frequency axis for use in distributed allocation, the value can be fixed to one value for simplification of processes in the system and a receiver. In this case, it is assumed that N is an integral multiple of M×M. As mentioned above, M represents the number of aggregation for Localized transmission, and is also the number of subsets at the time of Sub-sampling transmission.

Figure 20:
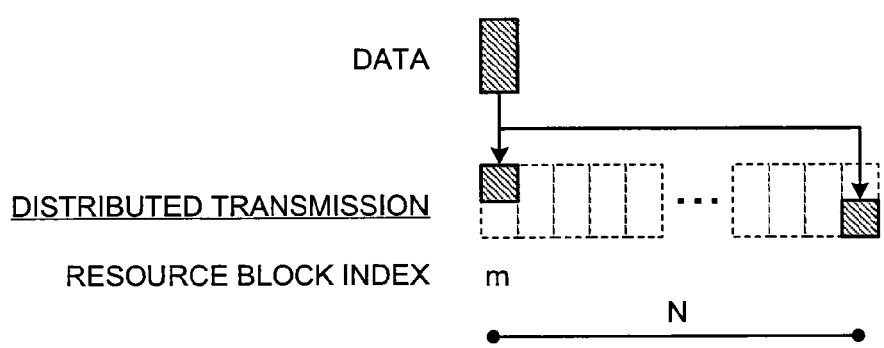
FIG. 20 is a diagram depicting a state of resource selection by Distributed transmission when the number of distribution is 2.
Figure 21:
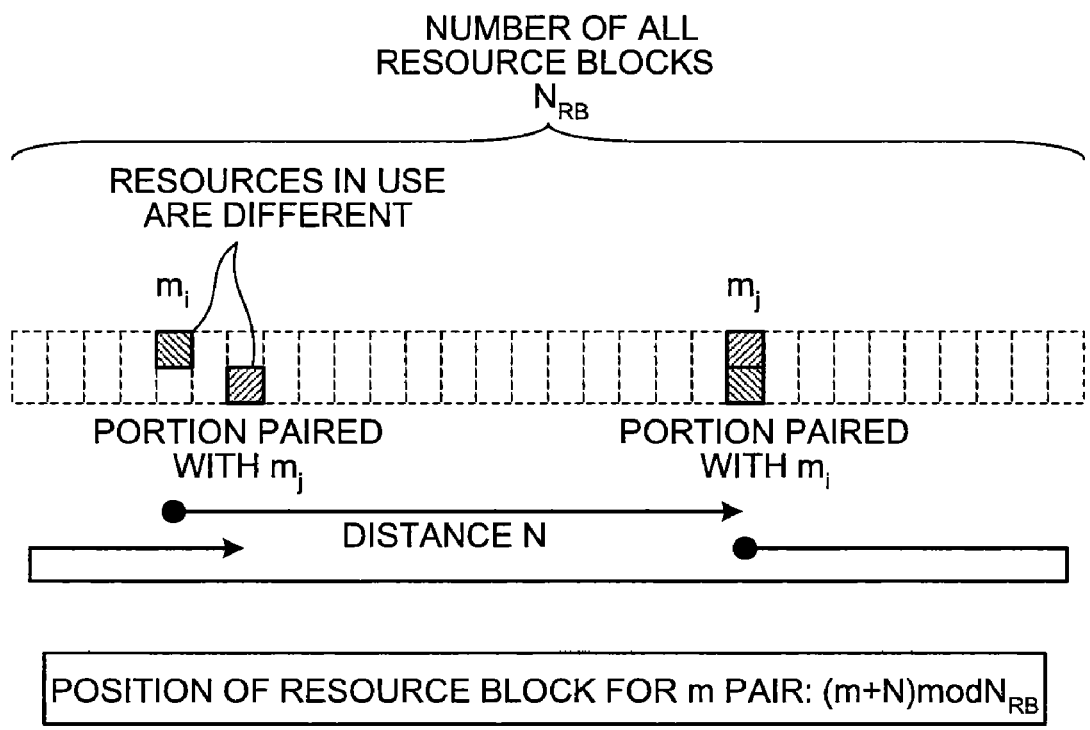
FIG. 21 is a diagram explaining a problem with conventional Distributed transmission (the number of distribution is 2).
Figure 22:
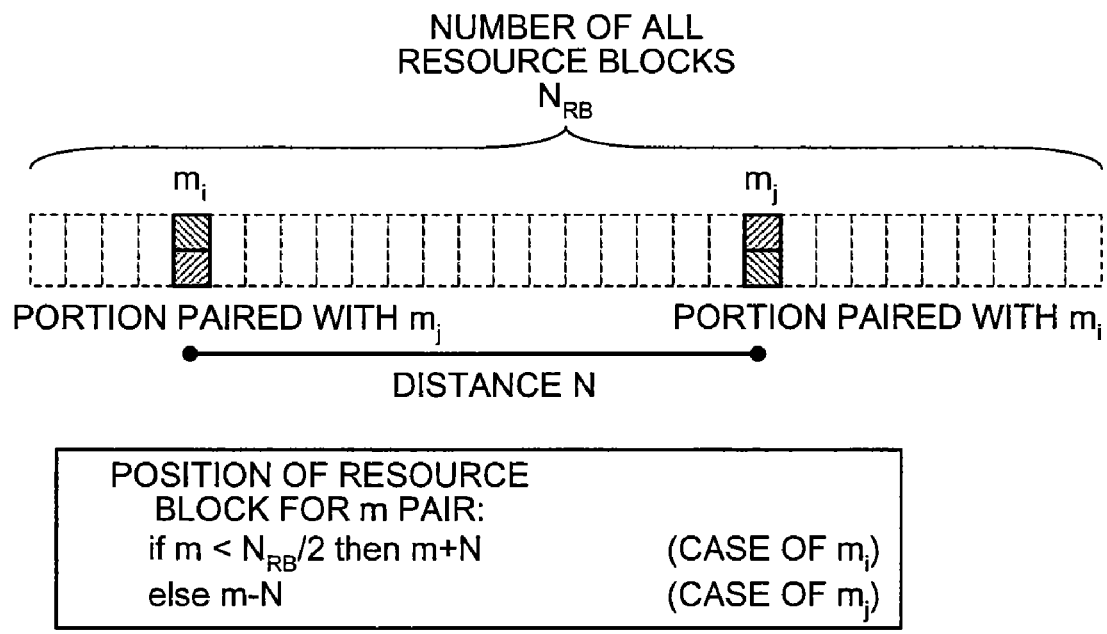
FIG. 22 is a diagram depicting a state of resource selection by Distributed transmission (the number of distribution is 2) in the fourth embodiment.

Also, when the number of distribution for Distributed transmission is 2, 3GPP has already stipulated that data is divided into two and the first half portion and the latter half portion of the data are mapped to different resource blocks (refer to FIG. 20). And, when this mapping is applied, a proposal is presented in which, in notifying the terminal of the resource block positions, a notification about only an index m of a resource block with only the first half portion is mapped is made. Also in this proposal, a resource block with the latter half portion being mapped is assumed to be at a position found from a calculation of $(m+N) \bmod N_{RB}$ by using the index m and the distance N on the frequency axis. Here, XmodY is the remainder obtained by dividing X by Y, and $N_{RB}$ is the number of all resource blocks that are present in the communication system. However, in this method, when m+N is equal to or greater than $N_{RB}$, a phenomenon (inconvenience) as depicted in FIG. 21 may occur. That is, even when the same distance N is set, as for data with its first half mapped to mi and data with its first half mapped to mj, the latter half of each data is not mapped to the same resource block. And, this results in a decrease in use efficiency of the resources. To prevent such a phenomenon, in the present invention, m and $N_{RB}/2$ are compared with each other and, when $m<N_{RB}/2$, the position of a resource block of a data portion paired with m is assumed to be m+N (corresponding to the case of mi in FIG. 22) and, otherwise, the position of the resource block of the data portion paired with m is assumed to be m−N (corresponding to the case of mj in FIG. 22). This can prevent a decrease in use efficiency of the resource blocks.

Note that, as with the case of the first to third embodiments explained above, the scheduling results obtained by the scheduler 2 are transmitted by the encoding/modulating/transmitting unit 3 to each terminal as resource allocation information. The resource allocation information transmitted from the base station to each terminal in the present embodiment includes information about the transmission type, a bit map representing the results of resource allocation to Localized transmission or Sub-sampling transmission, information indicative of the results of resource allocation to Distributed transmission (for example, indexes of resource blocks where the first half portion of data when the number of distribution in Distributed transmission is 2 is mapped), and others.

As for the first to fourth embodiments explained above, the following coordination or randomization technique can be applied. For example, in a cellular system where a plurality of base stations are disposed as a plain, the same system frequency band is repeatedly used. That is, the same frequency band and the same resource block may be used between adjacent base stations. In this system, a resource block allocated to a specific terminal is used in the area of an adjacent base station, and this may always cause interference. To avoid this, coordination or randomization is performed. For example, coordination is a technique of avoiding mutual interference by shifting resource blocks for Distributed transmission between adjacent base stations. And, randomization is a technique in which the interval of the resource blocks for Distributed transmission is not made constant, to create a situation in which specific resource blocks collide with each other between adjacent base stations but other resource blocks do not collide with each other.

In LTE, a technique is handled in which, when transmitted data cannot be correctly received at a receiving station, the same data is retransmitted. While N_DPRB can be varied in the above, a restriction may be provided in consideration of retransmission. That is, the restriction is such that N_DPRB at a retransmission timing has the same value as that of N_DPRB at the previous transmission timing. With this restriction imposed, the number of resource blocks becomes the same between Localized transmission and Distributed transmission and the position of the resource block becomes the same between the previous transmission timing and the retransmission timing. At the retransmission timing of retransmitting the same data, resources can be advantageously secured with ease.

INDUSTRIAL APPLICABILITY

As has been explained in the foregoing, the communication method according to the present invention is useful as a resource-allocation notifying method when, from among Localized transmission, Distributed transmission, and Sub-sampling transmission, at least Localized transmission and Distributed transmission are mixed in the same sub-frame.

The invention claimed is:

1. A base station in a communication system where a predetermined number of subcarriers are allocated to a terminal as a plurality of resource blocks, and M resource blocks adjacent to one another in a frequency domain are set as a resource block group, M being a positive integer,
   wherein the base station uses a first communication method and a second communication method,
   in the first communication method, the resource block group being classified repeatedly and sequentially into M kinds of subsets from a first subset to an M-th subset, and
   in the second communication method two resource blocks, which are separated by a predetermined distance in the frequency domain, being allocated to a same terminal, the predetermined distance being an integer multiple of M times M.

2. The base station according to claim 1, wherein the base station uses the second communication method, in which resource blocks in a same kind of subset are allocated to one terminal.

* * * * *